US007801920B2

(12) United States Patent
Todd et al.

(10) Patent No.: US 7,801,920 B2
(45) Date of Patent: Sep. 21, 2010

(54) METHODS AND APPARATUS FOR INDIRECTLY IDENTIFYING A RETENTION PERIOD FOR DATA IN A STORAGE SYSTEM

(75) Inventors: Stephen J. Todd, Shrewsbury, MA (US); Michael Kilian, Harvard, MA (US)

(73) Assignee: EMC Corporation, Hopkinton, MA (US)

( * ) Notice: Subject to any disclaimer, the term of this patent is extended or adjusted under 35 U.S.C. 154(b) by 477 days.

(21) Appl. No.: 10/762,036

(22) Filed: Jan. 21, 2004

(65) Prior Publication Data

US 2005/0160061 A1    Jul. 21, 2005

(51) Int. Cl.
*G06F 17/30* (2006.01)
(52) U.S. Cl. ...................................... 707/796
(58) Field of Classification Search ...................... 707/2, 707/3, 10, 200, 796; 714/42; 705/1
See application file for complete search history.

(56) References Cited

U.S. PATENT DOCUMENTS

| 5,535,322 | A  | * | 7/1996  | Hecht ............................. 705/1 |
| 6,185,576 | B1 | * | 2/2001  | McIntosh ....................... 707/200 |
| 7,263,521 | B2 | * | 8/2007  | Carpentier et al. .............. 707/4 |
| 2002/0156936 | A1 | * | 10/2002 | Burgess ......................... 709/328 |
| 2004/0153844 | A1 | * | 8/2004  | Ghose et al. ................... 714/42 |
| 2005/0055518 | A1 | * | 3/2005  | Hochberg et al. ............ 711/159 |
| 2005/0055519 | A1 |   | 3/2005  | Stuart et al. |
| 2005/0076293 | A1 | * | 4/2005  | Beresnevichiene ........... 715/514 |
| 2005/0188248 | A1 | * | 8/2005  | O'Brien et al. ................. 714/5 |

* cited by examiner

*Primary Examiner*—Etienne P LeRoux
(74) *Attorney, Agent, or Firm*—Muirhead and Saturnelli, LLC

(57) ABSTRACT

One embodiment is a method and apparatus for modifying retention periods in a storage system, in which previously defined retention periods for units of data may be reduced. In another embodiment, the retention period of a unit of data may be modified in response to the occurrence of an event by renewing previously defined retention periods until the occurrence of the event is detected. If the occurrence of the event is detected, a retention period associated with that event may be established for the unit of data. In yet another embodiment, retention classes are used to define retention periods for units of data so that the retention period of a unit of data may be modified without modifying the unit of data itself. In a further embodiment, a request to the storage system to reduce a retention period includes authentication information that the storage system may use to verify the request.

39 Claims, 7 Drawing Sheets

| Class | Retention Period |
|---|---|
| E-Mail | 7 yrs. |
| Financial Records | 5 yrs. |

801

METHODS AND APPARATUS FOR INDIRECTLY IDENTIFYING A RETENTION PERIOD FOR DATA IN A STORAGE SYSTEM

BACKGROUND OF INVENTION

1. Field of Invention

The present invention relates generally to data storage, and more particularly to data storage systems that associate a retention period with stored data.

2. Discussion of Related Art

Businesses and other institutions, such as hospitals, schools, and government agencies, often use data storage systems to maintain records in electronic form. Such records may include, for example, company financial records, electronic mail (e-mail), patient medical records, student transcripts, and other types of data. It may be important to the business or institution to maintain these records in their original form for a certain period of time after their creation. That is, the business or institution may desire to prevent the records from being deleted or modified until a certain period of time has elapsed. For example, a hospital may wish to prevent modification or deletion of patient x-rays for a certain number of years after the x-rays are taken. Further, such retention of data may be mandated by law. For example, Securities and Exchange Commission (SEC) Rule 17a-4 requires that companies preserve certain financial records for a period of six years.

With conventional storage systems, users may accidentally delete or modify such records. Alternatively, malicious users may intentionally delete or modify such records, for example to conceal unscrupulous business practices or to dishonestly alter school transcripts. Whether accidental or intentional, such acts may cause an irreparable loss of data or even a violation of law. While some computer systems include a file system front end (often on a host computer rather than on a storage system) that allows files to be designated "read-only," an administrator of the system typically has the ability to change the "read-only" status of files such that the files may be modified or deleted. Further, conventional file systems do not allow the user to specify a period of time for which data cannot be deleted or modified. That is, designating a file "read-only" means that the file cannot be deleted or modified so long as the file's read-only status is not altered.

Some storage systems store data on recording media, e.g., optical discs (such as, CD-ROM discs) which cannot be overwritten or modified. However, such systems do not allow the user to specify a retention period, as once data is written to the media it can never be deleted from the media, although the media may be physically destroyed to prevent access to the data. Such media is not reusable if it is ever desired to replace the data on the media with new data.

A technique for implementing a retention period for data stored in a storage system is disclosed in commonly assigned U.S. patent application entitled "Method and Apparatus for Data Retention in a Storage System", filed on Dec. 9, 2003 under Ser. No. 10/731,790, which is incorporated herein by reference in its entirety and hereafter referred to as the "Data Retention Application".

SUMMARY OF INVENTION

One illustrative embodiment is directed to a method of processing data in a computer system comprising at least one host and at least one storage system, the at least one storage system storing at least one unit of data having a previously-defined retention period during which the at least one unit of data is to be retained on the at least one storage system. The method comprises acts of: (A) receiving, at the at least one storage system, a request from the at least one host to reduce a length of the retention period for the at least one unit of data; and (B) reducing the length of the retention period for the at least one unit of data in response to the request. Another illustrative embodiment is directed to at least one computer readable medium that, when executed on a computer system, perform the above-described method.

A further illustrative embodiment is directed to a storage system for use in a computer system, including the c storage system and at least one host, the storage system storing, for the at least one host, at least one unit of data having a previously-defined retention period during which the at least one unit of data is to be retained on the at least one storage system. The storage system comprises: at least one storage device to store data received from the at least one host; and at least one controller that: (A) receives a request from the at least one host to reduce a length of the retention period for the at least one unit of data; and (B) reduces the length of the retention period for the at least one unit of data in response to the request.

Another illustrative embodiment is directed to a method of processing data in a computer system comprising at least one host and at least one storage system, the at least one storage system storing at least one unit of data having a previously-defined retention period during which the at least one unit of data is to be retained on the at least one storage system. The method comprises an act of: (A) sending, from the at least one host, a request to the at least one storage system to reduce a length of the retention period for that at least one unit of data. Another illustrative embodiment is directed to at least one computer readable medium that, when executed on a computer system, perform the above-described method.

A further illustrative embodiment is directed to a host computer for use in a computer system that includes the host computer and at least one storage system, the at least one storage system storing, for the at least one host, at least one unit of data having a previously-defined retention period during which the at least one unit of data is to be retained on the at least one storage system. The host computer comprises: at least one storage device; and at least one controller coupled to the at least one storage device that sends a request to the at least one storage system to reduce a length of the retention period for that at least one unit of data.

Another illustrative embodiment is directed to a method of processing data in a computer system comprising at least one host and at least one storage system. The method comprises acts of: (A) sending to the at least one storage system, a request to store a unit of data, from the at least one host, the request including a retention period for the unit of data (B) after expiration of at least some of the retention period, determining if a specified event has occurred; (C) when it is determined in the act (B) that the specified event has not occurred, extending the retention period for the unit of data; and (D) repeating the acts (B) and (C) until it is determined in the act (B) that the specified event has occurred. Another illustrative embodiment is directed to at least one computer readable medium that, when executed on a computer system, perform the above-described method.

A further illustrative embodiment is directed to a method of ensuring that a unit of data, stored on a computer system, is retained until a specified period after the occurrence of an event, the computer system comprising at least one host and at least one storage system that stores the unit of data. The method comprises acts of: (A) establishing an initial retention period for the unit of data, wherein the initial retention period is less than or equal to the specified period; (B) after the expiration of at least some of the initial retention period, determining whether the specified event has occurred; (C) when it is determined in the act (B) that the specified event has not occurred, performing acts of: (C1) extending the retention period for the unit of data for an extended period that is less than or equal to the specified period; and (C2) after the expiration of at least some of the extended retention period, determining whether the specified event has occurred and when the specified event has not occurred, returning to the act (C1), and when the specified event has occurred, proceeding to the act (D); and (D) when it is determined in either of the acts (B) or (C2) that the specified event has occurred at a time, extending the retention period so that the retention period expires the specified period after the time at which the event occurred. Another illustrative embodiment is directed to at least one computer readable medium that, when executed on a computer system, perform the above-described method.

Another illustrative embodiment is directed to a host computer for use in a computer system that includes the host computer and at least one storage system. The host computer comprises: at least one storage device and at least one controller coupled to the at least one storage device that: (A) sends to the at least one storage system, a request to store a unit of data, the request including a retention period for the unit of data; (B) after expiration of at least some of the retention period, determines if a specified event has occurred; (C) when it is determined that the specified event has not occurred, extends the retention period for the unit of data; and (D) repeats (B) and (C) until it is determined in (B) that the specified event has occurred.

A further illustrative embodiment is directed to a host computer that ensures that a unit of data, stored on a computer system, is retained until a specified period after the occurrence of an event, the computer system comprising the host computer and at least one storage system that stores the unit of data. The host computer comprises: at least one storage device and at least one controller coupled to the at least one storage device that: (A) establishes an initial retention period for the unit of data, wherein the initial retention period is less than or equal to the specified period; (B) after the expiration of the initial retention period, determines whether the specified event has occurred; (C) when it is determined in (B) that the specified event has not occurred, performs acts of: (C1) extending the retention period for the unit of data for an extended period that is less than or equal to the specified period; and (C2) after the expiration of the extended retention period, determining whether the specified event has occurred and when the specified event has not occurred, returning to the act (C1), and when the specified event has occurred, proceeding to (D); and (D) when it is determined in either of (B) or (C2) that the specified event has occurred at a time, extends the retention period so that the retention period expires the specified period after the time at which the event occurred.

Another illustrative embodiment is directed to a method of processing data in a computer system comprising at least one host and at least one storage system. The method comprises an act of: (A) transmitting at least one request, from the at least one host to the at least one storage system, requesting that the at least one storage system store a data unit until at least the expiration of a retention period, wherein the at least one request identifies the retention period indirectly by including information that enables the at least one storage system to determine the retention period. Another illustrative embodiment is directed to at least one computer readable medium that, when executed on a computer system, perform the above-described method.

A further illustrative embodiment is directed to a host computer for use in a computer system that includes the host computer and at least one storage system. The host computer comprises: at least one storage device and at least one controller coupled to the at least one storage device that transmits at least one request to the at least one storage system, requesting that the at least one storage system store a data unit until at least the expiration of a retention period, wherein the at least one request identifies the retention period indirectly by including information that enables the at least one storage system to determine the retention period.

Another illustrative embodiment is directed to a method of processing data in a computer system comprising at least one host and at least one storage system. The method comprises acts of: (A) receiving a request, from the host, to delete a unit of data stored on the storage system; (B) determining whether a previously-defined retention period for the unit of data has expired by performing acts of: (B1) retrieving first information, associated with the unit of data, that identifies a manner of accessing second information specifying the previously-defined retention period; and (B2) using the first information to retrieve the second information specifying the previously-defined retention period; and (C) when it is determined in the act (B) that the retention period for the unit of data has not expired, denying the request to delete the unit of data. Another illustrative embodiment is directed to at least one computer readable medium that, when executed on a computer system, perform the above-described method.

A further illustrative embodiment is directed to a storage system for use in a computer system, including the storage system and at least one host. The storage system comprises: at least one storage device to store data received from the at least one host and at least one controller that: (A) receives a request, from the host, to delete a unit of data stored on the storage system; (B) determines whether a previously-defined retention period for the unit of data has expired by performing acts of: (B1) retrieving first information, associated with the unit of data, that identifies a manner of accessing second information specifying the previously-defined retention period; and (B2) using the first information to retrieve the second information specifying the previously-defined retention period; and (C) when it is determined in (B) that the retention period for the unit of data has not expired, denies the request to delete the unit of data.

Another illustrative embodiment is directed to a method of processing data in a computer system comprising at least one host and at least one storage system. The method comprises acts of: (A) receiving, at the at least one storage system, a request from the at least one host to reduce a length of a previously defined retention period for a unit of data stored on the at least one storage system, wherein the request is received before the retention period for the unit of data has expired and includes authentication information; (B) determining if the request is authentic based, at least in part, on the authentication information; and (C) when it is determined in the act (B) that the request is not authentic, denying the request to reduce the retention period. Another illustrative embodiment is directed to at least one computer readable medium that, when executed on a computer system, perform the above-described method.

A further illustrative embodiment is directed to a storage system for use in a computer system, including the storage system and at least one host, the storage system comprises: at least one storage device to store data received from the at least one host; and at least one controller that: (A) receives a request from the at least one host to reduce a length of a previously defined retention period for a unit of data stored on the at least one storage system, wherein the request is received before the retention period for the unit of data has expired and includes authentication information; (B) determines if the request is authentic based, at least in part, on the authentication information; and (C) when it is determined in (B) that the request is not authentic, denies the request to reduce the retention period.

Another illustrative embodiment is directed to a method of processing data in a computer system comprising at least one host and at least one storage system, wherein the at least one storage system stores a unit of data having a previously defined retention period during which the at least one unit of data is to be retained on the at least one storage system. The method comprises an act of: (A) providing to the at least one storage system a request, from the at least one host, to reduce a length of the previously defined retention period for the unit of data, wherein the request is provided before the retention period for the unit of data has expired and includes authentication information to enable the at least one storage system to authenticate the request. Another illustrative embodiment is directed to at least one computer readable medium that, when executed on a computer system, perform the above-described method.

A further illustrative embodiment is directed to a host computer for use in a computer system that includes the host computer and at least one storage system that stores, for the host computer, a unit of data having a previously defined retention period during which the at least one unit of data is to be retained on the at least one storage system. The host computer comprises: at least one storage device and at least one controller coupled to the at least one storage device that: (A) provides to the at least one storage system a request to reduce a length of the previously defined retention period for the unit of data, wherein the request is provided before the retention period for the unit of data has expired and includes authentication information to enable the at least one storage system to authenticate the request.

DETAILED DESCRIPTION

Figure 1:
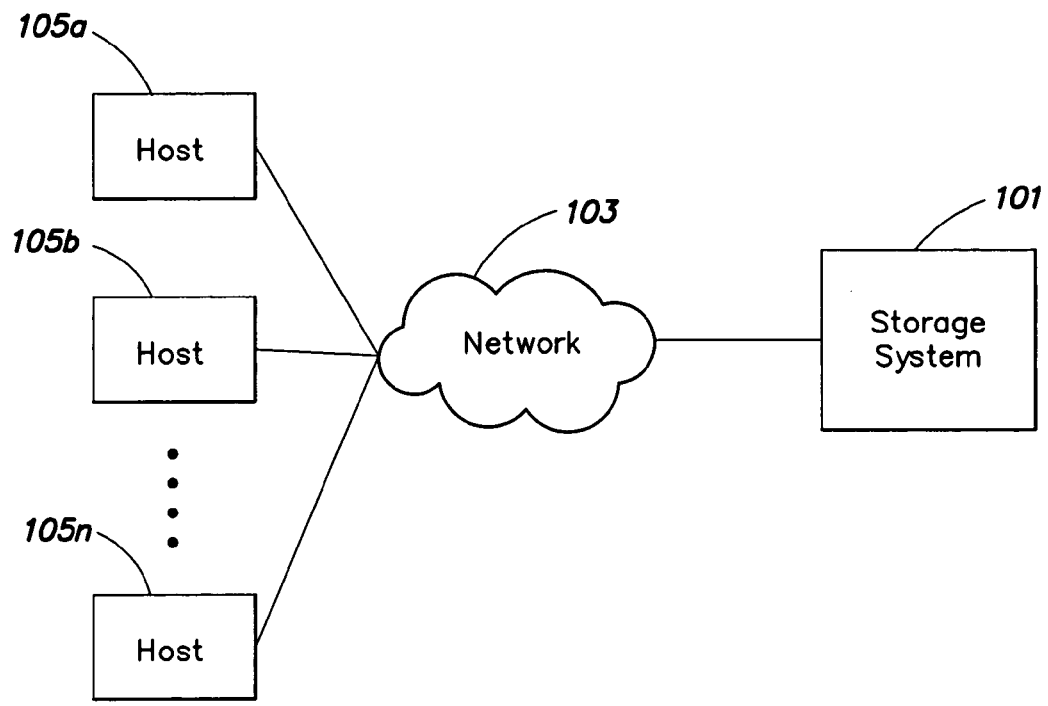
FIG. 1 is a block diagram of an illustrative computer system on which embodiments of the invention may be implemented.

Applicants have appreciated that in some circumstances, it may be desirable to provide the ability to allow a previously-defined retention period for a unit of data stored on a storage system to be modified. Thus, some embodiments of the present invention described below are directed to techniques for enabling the retention period for stored data units to be modified. While these techniques are at times described in connection with retention periods implemented in the manner described in the above-referenced commonly assigned application, it should be appreciated that the aspects of the present invention described herein are not so limited, and can be employed with computer systems that implement a retention period in any suitable manner.

In a system that implements a retention period for a unit of data, when sending a request to a storage system to store the data, a host computer (defined herein as any computer capable of writing data to a storage system) may provide the storage system with the data to be stored and an associated retention period. The retention period may, for example, define a period of time for which the data cannot be deleted or modified. The storage system may store the data and its associated retention period. If the storage system later receives a request from a host computer to delete or modify the data, the storage system may first evaluate the stored retention period associated with the data to determine if the retention period has expired. If the retention period has not expired, the storage system will not delete or modify the data. In this manner, once the retention period has been established for a unit of data, the storage system ensures that the unit of data is retained in an unmodified state for the duration of the retention period.

Applicants have appreciated that in some situations, it may be desirable to reduce the length of a previously defined retention period for a unit of data. For example, it may be desirable to establish an event based retention period, wherein data is retained until a specified period after the occurrence of an event. As an example, a unit of data may include as content an x-ray of a patient that is desired to be maintained until a specified period of time (e.g., two years) after the patient's death.

Event based retention can be implemented in any of numerous ways, as the present invention is not limited to any implementation technique. In one embodiment, a unit of data can be assigned an initial retention period that is certain to not expire before the occurrence of the event (e.g., 200 years or an indefinite period), and this period can be reduced after the occurrence of the event. Thus, in one embodiment of the invention, information can be sent to the storage system that either specifies the occurrence of an event triggering a change in a retention period for a unit of data, or that explicitly requests the reduction of a previously defined retention period.

It should be appreciated that event-based retention is not the only circumstance under which it may be desirable to reduce a previously-defined retention period. Thus, one embodiment of the present invention enables the reduction of a previously-defined retention period for any suitable purpose. A host computer may send a request to a storage system for any purpose to reduce the length of a previously defined retention period for the unit of data before the previously defined retention period has expired. In response to the request, the storage system may reduce the length of the previously defined retention period. As used herein, reducing a retention period refers to modifying a previously-defined retention period so that it expires at an earlier time.

In another embodiment of the invention, modifying a retention period based on the occurrence of an event may be performed by renewing previously defined retention periods until the event occurs. That is, a host computer may send a request to the storage system to store a unit of data on the storage system. The request may indicate an initial retention period for the unit of data. The host may, prior to the expiration of the initial retention period, check to determine if the event has occurred. If it has not occurred, the host may extend or renew the retention period to a time during which a subsequent check for the occurrence of the event will occur. When it is determined that the event has occurred, the host may allow the previously-defined retention period to expire and set a new retention period that expires at the appropriate time (e.g., two years after the death of the patient).

In another embodiment of the invention, a set of classes may be defined for retention periods to be assigned to units of data to facilitate the changing of retention periods for large groups of data units. The system may maintain a record that associates each class with a specified retention period. When a host computer sends a request to store a unit of data on the storage system, it may indicate the corresponding retention indirectly by specifying the class to which the unit of data belongs. The retention period for an entire class of data units may be changed by altering the retention period specified for the class. This is advantageous, in that a large class of data units can have their retention periods altered by simply updating the record for the class, and without individually altering the retention period of each unit of data in the class.

In another embodiment of the invention, authentication techniques are employed to verify the authenticity of any request to reduce a retention period and/or to specify the occurrence of an event that triggers a reduction in a retention period. This reduces the risk of a malicious user improperly reducing the retention period for a unit of data.

An illustrative system on which various embodiments of the invention may be implemented is shown in FIG. 1. FIG. 1 shows a storage system 101 that communicates with a plurality of hosts 105a, 105b, . . . , 105n through a network 103. As used herein, a "network" (e.g., network 103) is a group of two or more devices interconnected by one or more segments of transmission media on which communications may be exchanged between the devices. Each segment may be of any suitable type of transmission media, including one or more electrical or optical wires or cables made of metal and/or optical fiber, air (e.g., using wireless transmission over carrier waves) or any combination of these or other suitable transmission media.

Storage system 101 may include one or more storage devices (e.g., disks drives) to store applications, application data, user data, and the like in the computer system. Storage system 101 may be accessed by hosts 105 for the purposes of storing, retrieving, or performing operations on data stored on storage system 101. It should be appreciated that storage system 101 may be a device used primarily for data storage, or may be a device that performs a variety of other functions, such as executing user applications. That is, storage system 101 may be any device that is capable of storing and retrieving data.

Hosts 105 may be, for example, servers that provide resources (e.g., data storage, email, and other services), clients (e.g., general-purpose computer systems operated by users), network components (e.g., switches) or any other type of computer. Hosts 105 are coupled by network 103 to storage system 101 so that the hosts 105 can use the storage system 101 to store and retrieve data.

It should be appreciated that the system configuration shown in FIG. 1 is only an example of the types of systems on which aspects of the present invention can be implemented, as the invention is not limited to use with any particular type of system configuration. For example, there need not be multiple hosts connected to a single storage system, as there may be a single host and/or multiple storage systems. In addition, any of numerous other types of connections (e.g., direct connections) can be used in addition to, or instead of, a network to connect the host(s) to the storage system(s).

The host(s) 105 can access data on the storage system 101 in any of numerous ways, as the aspects of the present invention described herein are not limited to any particular type of system configuration. For example, in some computer systems, application programs executing on hosts 105 store information on files managed by a file system (e.g., executing on hosts 105). The file system maps the name of each particular file to one or more logical volumes, and blocks of storage therein, for storing the data within the file. The logical volumes may correspond directly to physical storage devices provided on the storage system 101, or when the storage system 101 is an intelligent storage system, the storage system may perform another layer of mapping between the logical volumes presented to hosts 105 and the actual physical storage devices within the storage system 101.

One embodiment of the present invention discussed below is adapted for use in a computer system of the type described in the following commonly assigned co-pending U.S. patent applications: Ser. No. 09/236,366, entitled "Content Addressable Information Encapsulation, Representation, and Transfer", filed Jan. 21, 1999; Ser. No. 09/235,146 entitled "Access to Content Addressable Data Over A Network", filed Jan. 21, 1999; Ser. No. 09/391,360, entitled System and Method for Secure Storage, Transfer and Retrieval of Content Addressable Information, filed Sep. 7, 1999; "Methods And Apparatus For Facilitating Access To Content In A Data Storage System", filed Dec. 9, 2003 under Ser. No. 10/731,613; "Methods And Apparatus For Caching A Location Index In A Data Storage System", filed Dec. 9, 2003 under Ser. No. 10/731,796; "Methods And Apparatus For Parsing A Content Address To Facilitate Selection Of A Physical Storage Location In A Data Storage System", filed Dec. 9, 2003 under Ser. No. 10/731,603; and "Methods And Apparatus For Generating A Content Address To Indicate Data Units Written To A Storage System Proximate In Time", filed Dec. 9, 2003 under Ser. No. 10/731,845, each of which is incorporated herein by reference in its entirety. These applications relate to content addressable storage (CAS), and together with the Data Retention Application referenced above, are referred to collectively as "the CAS applications".

In a content addressable system, data is stored using a content address generated based upon the content of the data itself. The content address may be generated by applying a hash function to the data to be stored. The output of the hash function is the content address that may be used in communication between the host and storage system to refer to the data. The content address can be mapped (e.g., within the storage system 101) to one or more physical storage locations within the storage system. The use of content addressing is particularly well adapted to applications wherein the information stored does not change (i.e., fixed content data).

One example of a hash function that may be used to generate the content address is message digest 5 (MD5). The content address can correspond directly to the result of the hash of the content, or additional information can be added to the hash result to generate the address. For example, information describing whether the content being stored is host data or metadata associated with host data can be added to the hash of the content to generate the content address. This additional information is useful in ways described below. It should be understood that any type of hash function may be used, as the aspects of the invention described herein are not limited to the use of any type of hash function. In fact, the aspects of the present invention described herein are not even limited to use in a content addressable system, and can be employed in other systems using other types of addressing schemes.

When a host sends data to the storage system to be stored therein, both the host and the storage system may independently compute the content address of the data. The host may retain the content address for use in the future to retrieve the data from the storage system. Alternatively, when the host sends data to the storage system, only the storage system may compute the content address and return the computed content address to the host for later use in accessing the data. As yet another alternative, both the storage system and the host may compute the content address, and the storage system can return its generated content address to the host. The host can compare its independently computed content address to the one received from the storage system to verify that they match.

Figure 2:
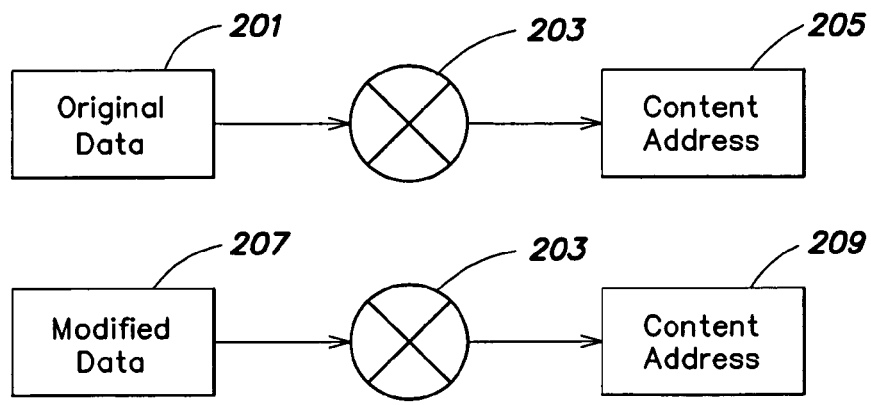
FIG. 2 is a diagram illustrating the generation of content addresses in a content addressable system on which embodiments of the invention may be implemented.

As discussed above, for some types of fixed content data, such as patient x-rays or company financial records, it may be desired to retain the data in its original form, which means that modification of the data should not be allowed once the data has been stored on the storage system. In one embodiment of the invention for use with systems such as those described in the above-referenced CAS applications, a characteristic of the content addressing system described in those applications is used to prevent modifications to previously written data. This characteristic is illustrated conceptually in FIG. 2, which illustrates that when a host stores original data 201 on a storage system, a content address 205 for the original data is generated by hashing function 203. The host may later retrieve a copy of the data from the storage system using content address 205. If the host seeks to modify the data and re-write it to the storage system as modified data 207, a new content address 209 is generated by hashing function 203 for the modified data. Because original data 201 and modified data 207 are different, hashing function 203 will generate different content addresses for data 201 and data 207. As a result, content addresses 205 and 209 will map to different physical storage locations on the storage system. Thus, when the host stores modified data 207 in the storage system, it is stored at a different location from original data 201 and does not overwrite the original data. Thus, original data 201 remains unmodified on the storage system.

It should be appreciated that the embodiment of the present invention that prevents modification of data once written is not limited to use with a content addressable system, as alternative techniques can be employed in systems using other types of addressing schemes to prevent modification of data previously written. For example, a host and/or file system may preclude writing to data previously written, and may require any modified data to be mapped to a different storage location.

Figure 3:
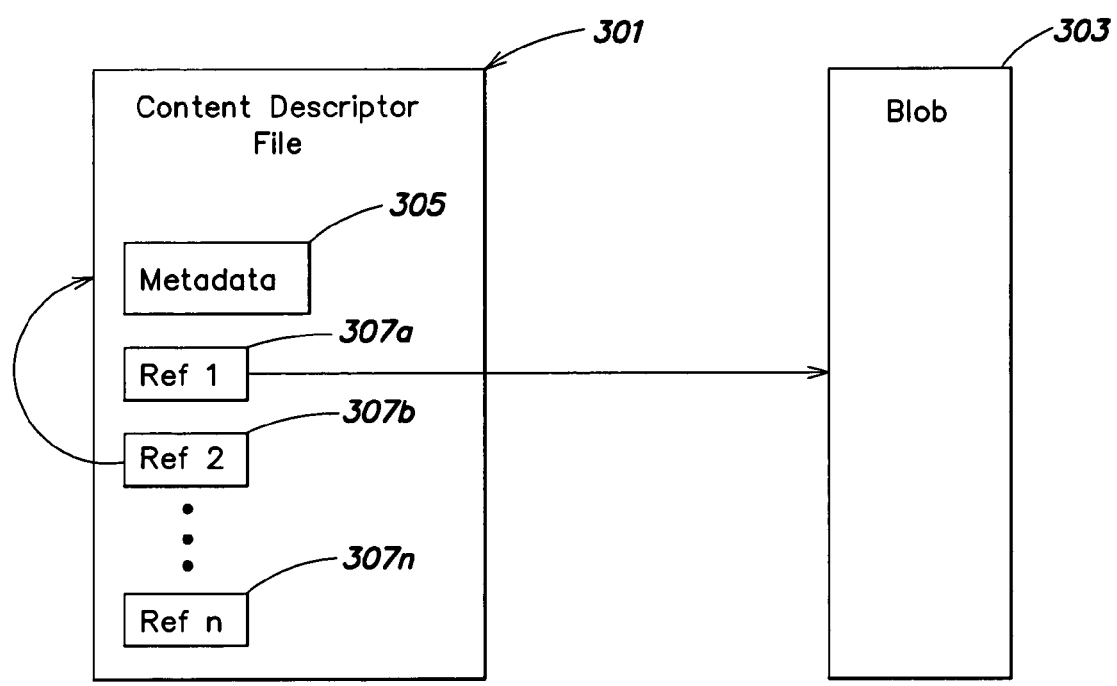
FIG. 3 is a block diagram illustrating an illustrative manner in which data may be stored on a content addressable storage system on which embodiments of the invention can be implemented.

As mentioned above, in addition to preventing modification of data, it may also be desirable to prevent deletion of data before the expiration of a previously defined retention period. One of the above-referenced CAS applications is directed to techniques for ensuring that data cannot be deleted during a previously specified retention period. As discussed above, one embodiment of the present invention can be used in connection with the architecture described in the CAS applications. FIG. 3 illustrates the manner in which data is stored in accordance with that architecture.

A unit of data in the architecture defined in the CAS applications is referred to as a blob (e.g., blob 303). Blob 303 may be, for example, the binary data to be stored by a host (e.g., host 105 in FIG. 1) on a storage system (e.g., storage system 101), such as, for example, a patient x-ray, company financial records, or any other type of data. When the blob 303 is stored to the content addressable storage system, a unique address is generated for the blob 303 based upon its content in the manner discussed above.

Each blob 303 has at least one content descriptor file (CDF) associated with it. CDF 301 may include metadata 305 and a plurality of references 307a, 307b, . . . , 307n. A CDF may reference one or more blobs or CDFs. Thus, the references 307 may be, for example, references to the blobs and/or CDFs referenced by CDF 301. Metadata 305 may, for example, include the creation date of CDF 301 (e.g., the date that CDF 301 was stored on the storage system) and a description of the content of blob 303. The metadata may further include information specifying a retention period related to the associated blob 303. The retention period may be, for example, specified as a period of time from the creation date of blob 303 and/or CDF 301 during which blob 303 and CDF 301 may not be deleted. Thus, for example, if the retention period included in CDF 301 is two years, the storage system will not permit deletion of CDF 301 and blob 303 for two years from the creation date identified in metadata 305 of CDF 301.

In accordance with one embodiment of the present invention, the retention period defined in the metadata 305 relates directly to the CDF 301, and only indirectly to the blob 303. This aspect of the present invention is adapted for use in a system architecture wherein a host cannot seek to directly delete a blob 303 (i.e., any such request is denied), but can only seek to delete a CDF 301, and wherein a garbage collection utility (described in more detail below) is employed on the storage system to clean up blobs that have been identified for deletion. A blob may be identified for deletion if there are no CDFs that reference it. In this respect, one aspect of that architecture is that a blob cannot be deleted so long as it is referenced by at least one CDF 301, but any blob that is not referenced by a CDF can be deleted.

It should be appreciated that the present invention is not limited to use in a system having the architecture described above, as many of the architectural features described above are merely implementation details. None is necessary to practicing the present invention. For example, rather than defining a retention period solely for a CDF, retention periods could alternatively be defined directly for a blob. If the blob itself carried a retention period, it would then be possible to allow host computers to directly delete blobs whose retention periods had expired.

The description of the blob 303 included in metadata 305 may include information describing the content of blob 303. For example, if blob 303 is an x-ray, metadata 305 may include information such as the patient's name, the date the x-ray was taken, additional doctor's notes regarding the x-ray or patient, or other information. It should be appreciated that the types of metadata given above are only examples of the types of metadata that may be included in metadata 305 of CDF 301. Indeed, any data related to blob 303 may be included in metadata 305, as the present invention is not limited in this respect.

As discussed above, CDF 301 may also include one or more references 307. These references may be, for example, references to blobs or other CDFs. For example, reference 307a may include the content address or file system location of blob 303, so that CDF 301 "points to" blob 303 through reference 307a. Hence, blob 303 may be accessed by a host using the content address or file system location of CDF 301, because reading the contents of CDF 301 provides the content addresses or file system location for blob 303. In the embodiment shown, CDF 301 also includes a reference 307b that "points to" itself, i.e., reference 307b includes the content address or file system location of CDF 301. This circular reference is provided to facilitate one embodiment of the garbage collection process described below in greater detail. However, the present invention is not limited to the use of that garbage collection process, or to the use of a circular reference in each CDF, as other implementations are possible. CDF 301 may include a plurality of other references that point to other CDFs or blobs, so that those CDFs or blobs may also be accessible using the content address of CDF 301.

In the example of FIG. 3, the circular reference 307b of CDF 301 is shown as being stored in CDF 301. It should be appreciated that when the content address of CDF 301 is used as reference 307b, an issue is raised with storing the reference in the CDF, as the content address of CDF 301 is not known until the content of CDF 301 is hashed, thereby precluding reference 307b from being hashed (with the rest of the content of CDF 301) to generate the content address for CDF 301. Thus, in one embodiment of the invention, the portion of CDF 301 that includes the circular reference is not used in generating the content address. For example, CDF 301 may be hashed and the hash value (i.e., the content address of CDF 301) may then be added as a portion of CDF 301 that is not used in generating the hash so that the content of the CDF that may be hashed later and compared to the content address to verify the integrity of the CDF content will not be impacted. In another embodiment, the circular reference is not stored in CDF 301. For example, the circular reference may be stored in a reference table external to CDF 301. Such a reference table is described below in greater detail.

In the example of FIG. 3, only one CDF (i.e., CDF 301) is shown "pointing to" blob 303. However, it should be appreciated that multiple CDFs may include references to the same blob. That is, two or more CDFs may "point to" the same blob. When multiple CDFs include references to the same blob, these multiple CDFs may include different metadata, including different creation dates and/or different retention periods. For example, one CDF that "points to" the blob may specify a retention period of two years from its creation date of Jul. 15, 2003, and a second may specify a retention period of three years from the same creation date. In accordance with one embodiment of the invention, the storage system may enforce the longest of the retention periods. Thus, on Jul. 15, 2005, the storage system will permit deletion of the first CDF, but will not permit deletion of the second CDF or the blob referenced thereby. However, on Jul. 15, 2006, the storage system will permit deletion of the first CDF (if not already deleted) and the second CDF, thereby allowing for garbage collection of the blob.

The embodiment of the present invention that employs the longest retention period specified for a blob does so to ensure that a user cannot circumvent an earlier-specified retention period by simply creating a new CDF for a blob that specifies a shorter retention period. The longest retention period for a blob is enforced in one embodiment of the invention by the above-described implementation wherein a blob cannot be deleted so long as it is referenced by any CDF. However, it should be appreciated that the aspect of the present invention that relates to enforcing the longest defined retention period is not limited to this implementation, as other techniques are possible.

When a host stores a blob on the storage system, it may provide the storage system with the blob and a CDF that is associated with the blob in a manner described in more detail below. The host may use the content address of the CDF to access the CDF, and thereby access the blob metadata and references included therein. The host may then use a blob reference (i.e., the content address or file system location of the blob) obtained from the CDF to access the blob (data) itself. Alternatively, after writing a blob, the host may retain the content address of the blob and use this content address to access the blob directly.

After a blob is created, one or more additional CDFs may be created that reference it. This may be done, for example, if it is desired to associate additional metadata with the blob, such as metadata to increase the retention period of the blob or add additional description information that is associated with the blob. Such additional CDFs may reference either the first CDF, the blob itself, or both.

In the example described above, the retention period was specified as a period of time in years from the creation date of the CDF. However, it should be understood that the retention period may be specified at a finer granularity. For example, the retention period may be specified in years, months, days, hours, minutes, seconds, or any combination of these (or any other) lengths of time. Further, the retention period need not be specified as a period of time from the creation date of the CDF. For example, the retention period may be specified as a date and/or time when the CDF and referenced blobs may be deleted, or in any other suitable way. In one embodiment discussed in detail below, the retention period may be specified as a period of time from the occurrence of a specified event.

Figure 4:
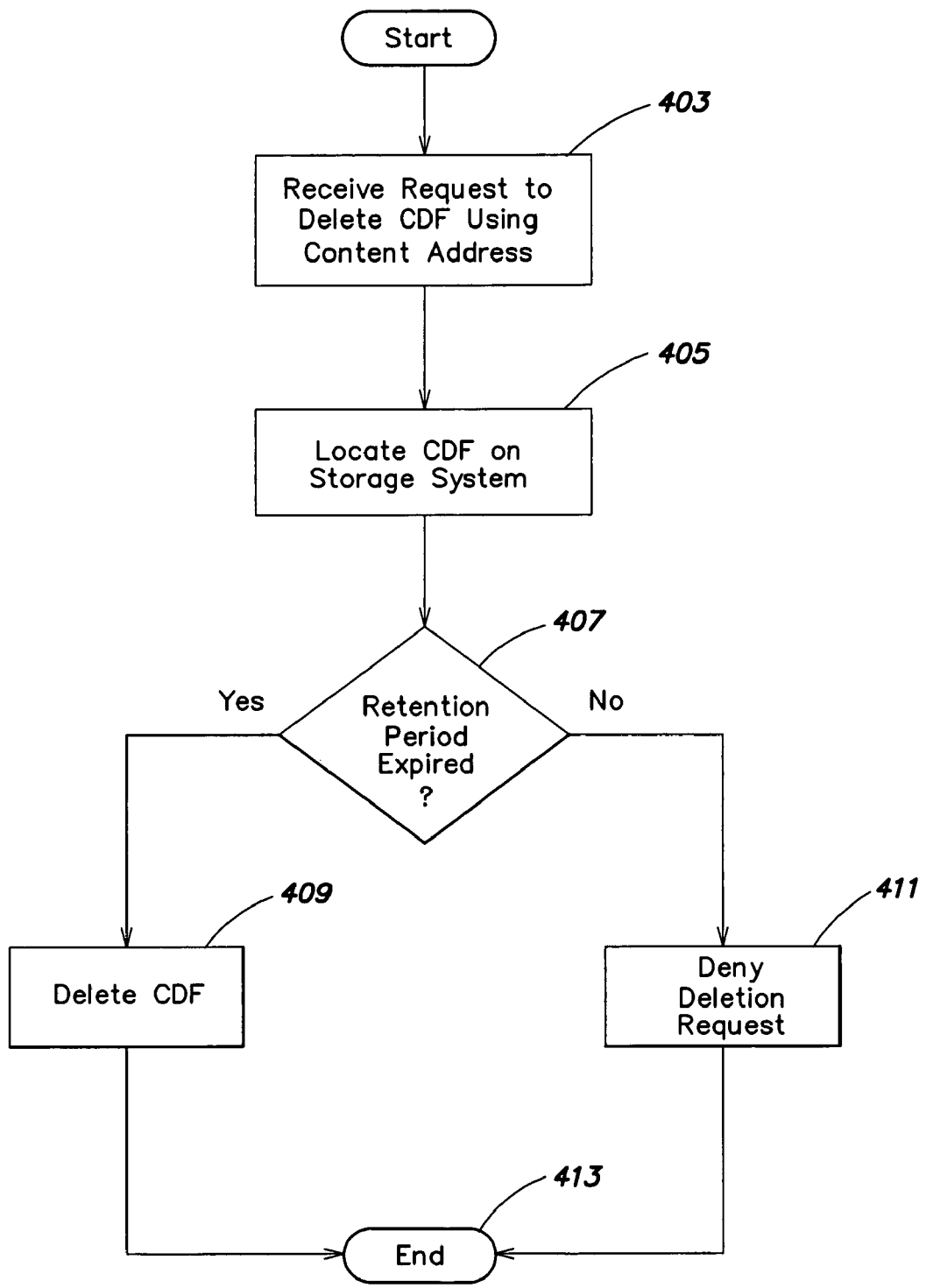
FIG. 4 is a flow chart illustrating a process by which data may deleted from a storage system, in accordance with one embodiment of the invention.

FIG. 4 is a flow chart that illustrates the process for handling a request to delete a CDF from a storage system. This process can be executed by the storage system itself, or by a separate computer that provides an interface between the host(s) and the storage system. The process begins in act 403 with the receipt of a request at the storage system to delete a CDF. As discussed above, the request may, for example, identify the CDF by its content address. In one embodiment of the present invention, techniques are employed to ensure that the subject of the deletion request is in fact a CDF. Those steps can be performed before initiating the process shown in FIG. 4, or alternatively, can be integrated into the process, by performing an additional verification step, and by denying the request if it is not directed to a CDF. After the request is received, the process proceeds to act 405, where the CDF is read from the storage system. The process then proceeds to act 407, where the process examines the metadata of the CDF and evaluates the retention period to determine if the retention period has expired. When the retention period has expired, the storage system deletes the CDF in act 409, and then terminates in act 413. Deletion of the CDF may be performed in several different ways, as will be discussed below in more detail. As mentioned above, deletion of the CDF may lead (indirectly) to deletion of any blobs referenced by the CDF in a manner discussed below in greater detail. When it is determined in act 407 that the retention period has not yet expired, the process denies the request to delete the CDF. The storage system may optionally return an error message to the requester (e.g., a host). The process then terminates at act 413.

Information relating to the CDFs and blobs can be stored in any suitable manner, as the present invention is not limited to any particular implementation technique. In accordance with one embodiment of the present invention, such information is stored within tables in a database suitable for use with unstructured variable length records. Each blob and CDF may have an associated table that stores, for example, the content address of the blob or CDF, the content address of any CDFs that reference (or point to) the blob or CDF, and other information, such as which physical storage location(s) (e.g., disks) store the blob or CDF, a creation timestamp, the physical location(s) for any mirrors of the blob or CDF, etc. The reference tables for a CDF need not include entries identifying which blobs the CDF points to, because the content of the CDF itself contains such information. The reference tables may include a reference count to be used in a garbage collection process such as that described in the CAS applications. The garbage collector is a background process that continually executes to delete blobs that are unreferenced by a CDF. The reference count may indicate how many CDFs reference a particular blob or CDF. For example, the garbage collector may examine the reference count associated with a particular blob or CDF to determine if any CDFs reference the particular blob or CDF. If the blob or CDF is unreferenced, the garbage collector may delete it. Many other types of information may be stored in the table, as the invention is not limited in this respect. It should be appreciated that the entire table need not be stored in a single location on a single storage system, and that parts of the table may be distributed throughout different locations of one or more storage systems. Additionally, it should be understood that a single database need not be employed to store the tables for all blobs and CDFs, as any suitable configuration can be used, including one that does not employ database tables at all.

While some embodiments described herein are adapted for use with a system that employs a garbage collection utility that operates in the manner described in the above-referenced CAS applications, it should be appreciated that the aspects of the present invention are not limited in this respect, and can be employed with systems that use a garbage collection utility that operates in other manners, and can alternatively be employed with system configurations that do not employ any garbage collection utility at all.

As should be appreciated from the foregoing, embodiments of the present invention can be used in systems where a CDF may point not only to blobs of data, but also to other CDFs. This architecture is useful in creating hierarchies of stored information. For example, a blob could contain an x-ray for an individual, such that a first level CDF may refer to the x-ray and identify it as belonging to a particular individual. In addition, that x-ray may also be grouped with a number of x-rays for that individual, or his family, with a higher level CDF pointing to a number of the lower level CDFs to create a logical hierarchy.

In accordance with one embodiment of the present invention, when a higher level CDF is created that points to one or more lower level CDFs, the references to the lower level CDFs are included in the content of the higher level CDF, so that the higher level CDF logically points to the lower level CDFs. In one embodiment, references to lower-level CDFs may simply be included as metadata or descriptors in the content of the higher level CDF, as the architecture does not contemplate one CDF pointing to another in the manner in which a CDF points to a blob as discussed herein (i.e., the address of the higher level CDF is not provided in the reference table for the lower level CDF). However, in an alternate embodiment of the present invention, such references can be provided so that a higher level CDF may point to a lower level CDF and have its address provided in the reference table for the lower level CDF. In accordance with this implementation, the lower level CDF cannot be deleted while it is pointed to by the higher level CDF, such that deletion of the lower level CDF will require a prior deletion of the higher level CDF.

As discussed above, in embodiments of the present invention, the storage system does not permit deletion of a CDF unless its retention period has expired. Applicants have appreciated that in some situations, it may be desired to reduce the length of a previously defined retention period before that retention period expires. Such situations may arise, for example, when an event occurs that may obviate the need to retain the data for the entire length of a previously defined retention period. For example, the death of a medical patient may obviate the need to retain the patient's medical records for the entire retention period. Similarly, it may desired to reduce the length of the retention period for mortgage documents once the mortgage has been paid off. Thus, Applicants have appreciated that in some applications it may be desired to permit the reduction of previously-defined retention periods, while in other applications such reductions may not be permitted.

As discussed above, the retention period for a unit of data may be increased by adding a new CDF that references the unit of data and has a retention period that expires later than any of the other CDFs that reference that unit of data. Conversely, one embodiment of the invention enables the retention to be modified by reducing the retention period.

Figure 5:
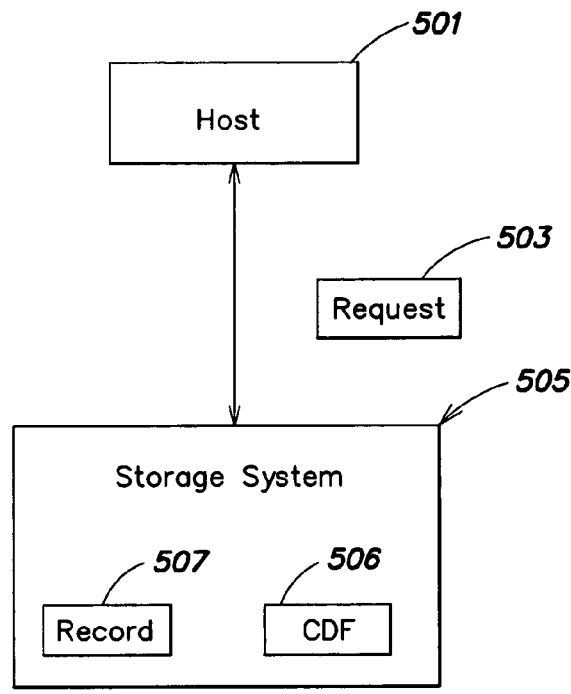
FIG. 5 is a block diagram illustrating an illustrative manner in which the retention period of a unit of data may be reduced, in accordance with one embodiment of the invention.

One illustrative embodiment of the invention in which the retention period of a unit of data may be reduced is shown conceptually in FIG. 5. In FIG. 5, host 501 sends a request 503 to storage system 505. The request 503 seeks to reduce the retention period for a CDF 506 stored in the storage system 505. As mentioned above, the embodiment of the present invention that relates to reducing a retention period is not limited to doing so in response to an explicit request 503 from a host, as other ways of initiating a reduction in a retention period are possible.

The manner in which the previously-defined and/or new retention periods can be stored in the storage system 505 is not limited to any particular implementation technique, as numerous techniques are possible. For example, in one embodiment of the present invention, the retention period for a CDF can be provided as metadata within the CDF itself, and when the retention period is updated, the CDF can be rewritten with the new retention period.

In another embodiment of the present invention, the retention period for a CDF is stored outside of the CDF (e.g., in a separate record 507), rather than in the metadata of the CDF itself. When the retention period is stored in the metadata of the CDF itself, reducing the length of the retention period alters the content of the CDF. As discussed above, one use for the aspects of the present invention relating to permitting the reduction in a previously-defined retention period is in a system such as that described in the above-referenced CAS applications, in which when a CDF is read, a hashing function is performed on the data to compare it to the content address for the CDF to verify that the correct data has been read and that it has not been modified. When used in connection with such a system, an altering of the content of the CDF itself to change the retention period will either prevent such verification from taking place, or will result in the content address for the CDF needing to be regenerated when the content of the CDF is updated to change the retention period. When used in connection with such a system, the aspect of the present invention described herein wherein the retention period is stored external to the CDF is advantageous, in that the length of the retention period may be reduced without altering the content of the CDF and/or the content address for the CDF.

It should be appreciated that record 507 may be stored in any suitable manner (e.g., on the storage system) and linked to the corresponding CDF in any suitable way. For example, record 507 may be stored in a database table or a set of database tables. Alternatively, record 507 may be stored as a file in the file system of the storage system or in any other suitable manner, as the invention is not limited in this respect.

As mentioned above, request 503 may be a request to reduce the length of the retention period of a CDF. Request 503 may include, for example, the content address of the CDF whose retention period is to be reduced and may specify a new retention period for the CDF. Storage system 505 may receive request 503 from host 501 and reduce the retention period of the CDF by modifying the retention period associated with the CDF. The storage system may, for example, process future requests to delete the CDF using the new retention period.

It should be appreciated that in the above-discussed example, request 503 included a content address of the CDF and a new (reduced) retention period for the CDF. However, it should be appreciated that request 503 may include additional and/or alternate information, as the invention is not limited in this respect, so that any other suitable information can be provided. For example, rather than an explicit request to reduce the retention period, request 503 may include information such as the name or type of an event that has occurred, and in response to which the retention period is to be reduced. For an event based reduction, the new retention period may be specified in the request, or the storage system may have previously-stored information specifying the length of the new retention period triggered by the event.

Figure 6:
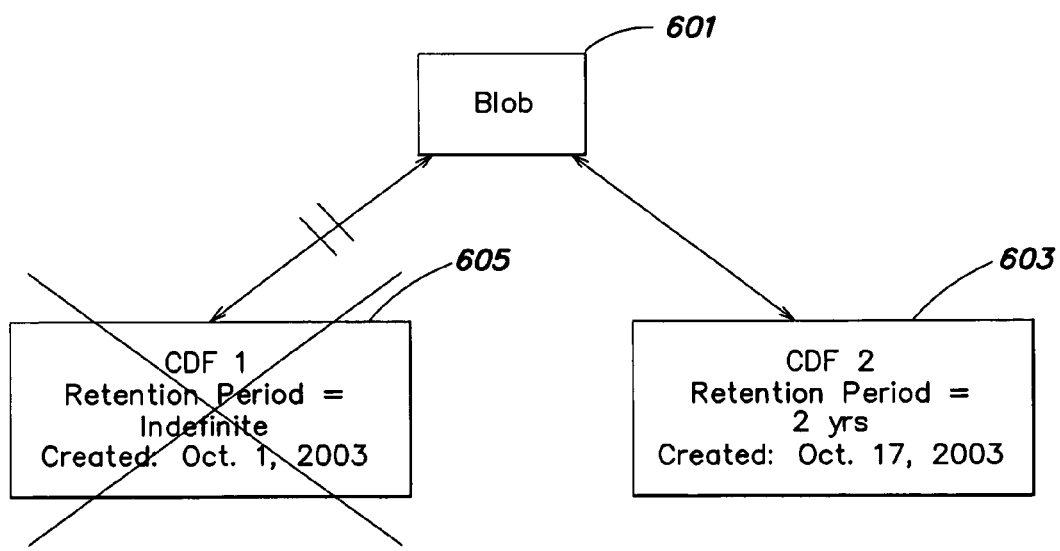
FIG. 6 is a block diagram illustrating an illustrative manner in which the retention period of a unit of data may be reduced, in accordance with one embodiment of the invention.

As mentioned above, in one embodiment of the invention, the retention period may be stored within the CDF itself. An example is shown in FIG. 6, wherein a blob 601 is referenced by a CDF 605 having an indefinite retention period, such that the CDF cannot be deleted unless and until its retention period is reduced. When it is desired to reduce the retention period of blob 601, the host may send a request (e.g., such as the request 503 in FIG. 5) to the storage system to reduce the retention period. The request can be implemented in any of numerous ways, as the present invention is not limited to any implementation technique. For example, the request can be to delete CDF 605 and create a new CDF 603 for blob 601. The new CDF 603 may have the same content (i.e., metadata and references) as CDF 605, but may have a different retention period and creation date. For example, the new CDF 603 may have a retention period of two years and a creation date of Oct. 17, 2003. Thus, after CDF 605 has been replaced by CDF 603 and deleted, the retention period of blob 601 expires on Oct. 17, 2005. The deletion of CDF 605 and the storage of CDF 603 may be treated as an atomic operation, such that one cannot be performed without the other. That is, the storage system may not delete CDF 605 without first creating CDF 603. In this manner, blob 601 is not left unreferenced (and available for garbage collection) by the deletion of CDF 605.

Because the content of the new CDF 603 is different than that of CDF 605, CDF 603 may (assuming that the entire CDF content is used in generating the content address) have a different content address than that of CDF 605. The host computer (or applications executing on host computers) that stores the CDFs 603 and 605 may maintain records of the content addresses for future access to the CDFs. Thus, when a CDF is replaced as described above, the host may update its records to store the content address of the new CDF 603 and remove the content address of CDF 605. Further, as discussed above, the storage system may maintain additional records for a CDF, including, for example, the content address of any CDFs that reference the CDF, and information about the physical storage location of the CDF on the storage system. When additional records are maintained, the storage system may also update those records to replace the content address of CDF 605 with the content address of the new CDF 603.

As discussed above, in one embodiment of the invention, a blob may not be deleted (e.g., directly or via the garbage collector) while it is referenced by a CDF. Thus, as long as the CDF or CDFs that reference the blob exist, the blob may not be deleted. Consequently, the effective retention period for a blob is established by the one of the CDF(s) that references it that has the retention period that expires the latest. Thus, it should be appreciated that in the examples of FIG. 5 and FIG. 6, reducing the retention period of a CDF may not reduce the retention period of a blob referenced thereby if there are other CDFs referencing the blob that have retention periods expiring later in time.

As discussed above, the retention period of a CDF may be reduced in response to the occurrence of an event, such as the death of a patient or the payment in satisfaction of a loan, but the invention is not limited in this respect, as the retention period of a CDF can be reduced in response to other events, or in response to requests that are not event based.

In one embodiment of the invention irrespective of whether the retention period is stored within the CDF or external to the CDF, the storage system may permit the retention period of only certain classes of CDFs to be reduced. For example, when a CDF is created, it may be specified as one whose retention period can be reduced, or as one whose retention period cannot be reduced. This can be done in any of numerous ways, as this aspect of the invention is not limited to any particular implementation technique. For example, each CDF may be given a fixed retention period or an indefinite retention period. For any CDF having a fixed retention period, the length of the retention period may not be reduced. Rather, only CDFs having an indefinite retention period may have the length of their retention period reduced. Alternatively, the designation of a CDF as belonging to a class whose retention period can or cannot be reduced can be established by other types of information, such that some CDFs having a fixed retention period can be designated as having retention periods that can be reduced, whereas others can be designated as having retention periods that cannot be reduced.

It should be appreciated that the aspect of the present invention described above that enables a reduction in the retention period of only certain classes of CDF is advantageous, in that it provides an additional level of security that prohibits some CDFs from being deleted prior to the expiration of their originally defined expiration period. In this respect, at the time a CDF is written, a decision is made as to whether it will have a retention period that can be reduced or not. This prevents anyone from spoofing the system at a later time by attempting to reduce the retention period for a CDF having a non-reducible retention period. In addition, when used to implement event-based retention (e.g., by establishing an indefinite retention period until the occurrence of an event and then a specified retention period thereafter), this aspect of the present invention ensure that CDFs that have retention periods that are not event based are not at risk of having their retention periods reduced improperly.

While the aspect of the present invention that enables a retention period to be reduced only for a special class of data objects provides the advantages discussed above, it should be appreciated that the present invention is not limited in this respect, as other embodiments of the present invention can be employed that enable any retention period to be reduced.

In another embodiment, a flag may be associated with a data unit (e.g., a CDF) that indicates whether the retention period of the data unit may be reduced. For example, such a flag may indicate that the retention period of a CDF may be never be reduced, may be reduced one time, may be reduced a specified number of times, or may be reduced an unlimited number of times. For CDFs with a flag specifying the number of times the retention period can be reduced, when the retention period of the CDF is reduced, the value of the flag may be updated.

The flag may be stored in the metadata of the CDF itself or may be stored in a record (e.g., a table) external to the CDF (e.g., record 507 of FIG. 5). When the flag is stored within the CDF itself and the retention period of the CDF is reduced, a new CDF may be created with the new retention period, in much the same manner as described above in connection with FIG. 6. This new CDF may store the flag with an updated value. For example, if the flag of the original CDF indicated that the retention period of the CDF may be reduced two times, the flag of the new CDF (created to replace the original CDF after reduction of the retention period) would indicate that retention period may be reduced only one more time.

When the flag is stored in a record external to the CDF, the flag may be updated in the record when the retention period of the CDF is reduced.

The aspect of the present invention that employs a separate record to store a flag indicating whether or not a retention period for a CDF can be modified can be combined with either of the above-discussed embodiments in which the value of the retention period is stored in the CDF itself, or in a record outside of the CDF.

In a further alternate embodiment of the present invention, rather than storing the flag and/or retention period in a record outside of the CDF, the flag and/or retention period can alternatively be stored within the CDF itself, but within a portion thereof that is not processed by the hash function that generates the content address for the CDF. This is advantageous in that changes to the flag and/or the retention period do not result in a change of the content address for the CDF, so that the application program that initially wrote the CDF need not track any change in the corresponding content address. Of course, if any information is stored in a portion of the CDF that is not used in generating the hash for the CDF, the above-described embodiment of the present invention that regenerates the content address upon the read of the CDF to ensure that the content has not been modified is not effective to ensure that the portion of the CDF excluded from in the hash has not been modified. In one embodiment of the present invention, an additional hash can be created for the aspect of a CDF that is not employed in the overall content address for the CDF, and that additional hash function can be regenerated when the CDF is read to ensure that the content has not been modified.

In some aspects of the present invention, techniques can be employed to maintain a history of any modifications to a previously-defined retention period. The history may comprise a non-deletable record of all modifications that have been made to any retention period. This provides an additional level of security, in that any attempt to reduce a retention period results in footprints left behind that can be traced. Similarly, in some embodiments of the present invention, a lock technique can be employed to prevent the retention period for one or more data units (e.g., CDFs) from being modified.

Either of the history and lock features described above can be employed with any of the embodiments described herein, and are not limited to implementation with any particular embodiment. In addition, these features can be implemented in any suitable manner, as these aspects of the present invention are not limited to any particular implementation technique.

In another embodiment of the invention, retention periods may be reduced (or eliminated) by using a privileged command. A privileged command may enable a CDF (or other data unit) to be deleted before its retention period has expired, or may be used to reduce a previously-defined retention period. In one embodiment, when a CDF is deleted or has its retention period reduced, an audit log entry is created and stored on the storage system. In one embodiment, the deletion of the CDF (or the reduction of its retention period) and the creation of the audit log entry is an atomic operation, such that the CDF may not be deleted (or have its retention period reduced) without the audit log entry being created. In the examples discussed below, the audit log entries are described as being created in response to a request to delete a CDF prior to expiration of its retention period but it should be understood that entries can also, or alternatively, be created in response to requests to reduce a previously defined retention period.

The audit log may include any suitable information. For example, the audit log may include the time of deletion of the CDF, some justification for the deletion (e.g., the occurrence of an event), an identifier for the CDF (e.g., its content address or some metadata of the CDF), the name of the user who deleted the CDF, and/or any other suitable information. The deletion of the CDF may leave any blob previously referenced by the CDF unreferenced (i.e., if there are no other CDFs that reference it). Thus, if it is desired to prevent such a blob from being deleted by the garbage collector utility, a new CDF that references the blob may be created. The new CDF may have a retention period that expires before the original retention period was set to expire. In this manner, the length of the retention period for the blob may be reduced.

The use of a privileged delete provides some advantages as compared with the above-described embodiment wherein different classes of CDFs are defined, with only some being capable of deletion. However, in one embodiment of the present invention, the use of a privileged delete command makes all CDFs subject to deletion, as opposed to a limited class. The risks of improper deletion are mitigated, in at least some respects, by requiring that for making an audit log entry be created for any deletion.

As discussed above, in accordance with one embodiment of the present invention, the audit log entry can include the content address for the deleted CDF. This can be advantageous in some embodiments of the present invention, as it leaves behind a record that is based in part on the content of what was deleted. However, it may be desirable in some applications to delete CDFs in a way that does not leave behind a record based upon the deleted content. Thus, in an alternate embodiment of the present invention, the audit log entry for a deleted CDF provides no indication of the content of the deleted CDF.

It should be appreciated that the aspects of the present invention that relate to a privileged command, with the associated creation of an audit log, can be combined with any of the embodiments described above, such that any CDF that is deleted or has its retention period reduced can result in the creation of an audit log entry.

As should be appreciated from the foregoing, aspects of the present invention contemplate numerous types of retention periods, including fixed retention periods that cannot be shortened, an indefinite retention period that can be shortened, an indication of no retention period at all (such that the entry can be deleted whenever it is desired), and modifiable retention periods wherein a data unit can be retained for a specified period (or an indefinite period), but wherein the retention period can be shortened, optionally with the requirement of making an audit log entry. In addition, in connection with any retention period that can be reduced, information can be provided to specify whether the retention period can be reduced one time, a specified number of times, or an unlimited number of times.

Another embodiment of the present invention is directed to a technique for implementing event based retention without having to reduce a previously-defined retention period for the associated unit of data. Thus, this technique can be employed with systems (such as the one described in the above-referenced CAS applications) that need not provide any protocol or command for reducing a previously-defined retention period.

In accordance with one embodiment of this aspect of the present invention, a retention period for the data object is initially established that is less than or equal to the time period that the data is to be retained subsequent to the occurrence of the triggering event. At some time during the initial retention period, a check is performed to determine whether the specified event has occurred. If so, a new retention period for the object is specified to expire the desired period of time after the time when the event occurred. Alternatively, if it is determined that the event has not occurred, another retention period is established that is less than or equal to the duration that the data object is to be retained subsequent to the occurrence of the event, and the checking and re-establishment of such a retention period is continually performed until it is determined that the event has occurred, at which time the retention period for the object is set to the specified period subsequent to the occurrence of the event in the manner described above. In this manner, it can be ensured that the data object is retained until the occurrence of a specified event, and no ability need be provided to reduce a previously defined retention period.

Figure 7A:
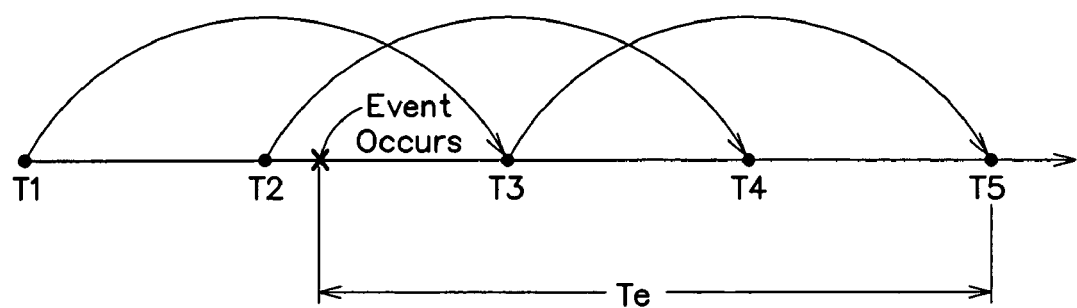
FIG. 7A is a timeline illustrating an example of a technique for implementing event based retention by employing the renewal of retention periods in accordance with one embodiment of the invention.
Figure 7B:
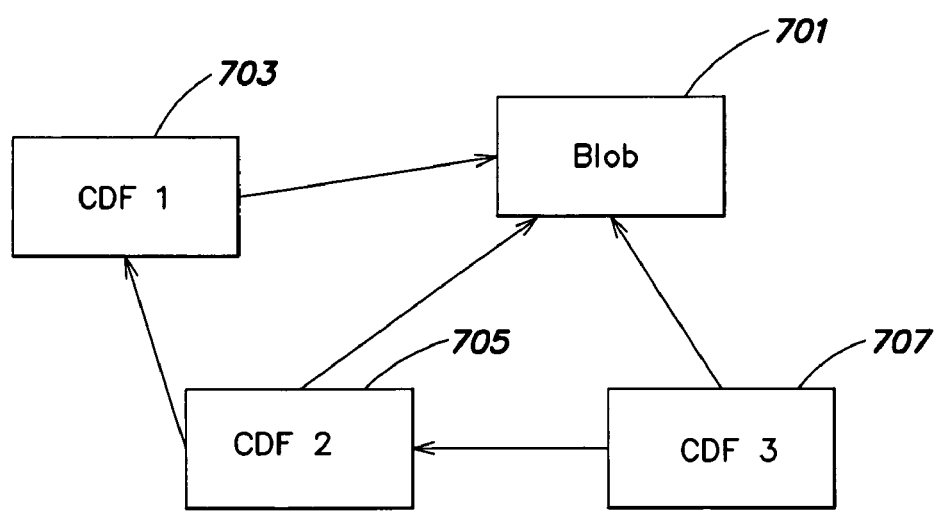
FIG. 7B is a block diagram illustrating the creation of CDFs having retention periods at points in time specified in the timeline of FIG. 7A.

FIG. 7A is a timeline which conceptually shows the creation of a series of retention periods to implement event based retention in accordance with this embodiment of the invention. FIG. 7B shows a blob 701 and CDFs 703, 705, and 707 that each reference the blob 701 and are created in accordance with the timeline of FIG. 7A to implement event based retention so that blob 701 is retained a specified period of time $T_e$ after the occurrence of an event. At time $T_1$, a host computer sends to the storage system blob 701 and CDF 703 that references it. CDF 703 has a retention period that expires at time $T_3$, which has a duration less than the duration of $T_e$. At time $T_2$, which is sometime prior to the expiration of the initial retention period established at T1 the host computer checks to see if the event has occurred. In the example of FIG. 7A, the event has not yet occurred. Therefore, the host computer sends a new CDF 705 to the storage system. The new CDF 705 also has a retention period with a duration less than that of $T_e$. The retention period of CDF 705 expires at time T4.

Thus, at time T2, the retention period for blob 701 is extended (i.e., until time T4) by the creation of CDF 705.

At time T3, the host computer again checks to determine if the event has occurred. In the example of FIG. 7A, the event occurred between times T2 and T3. Thus, at time T3, the host computer sends to the storage system a CDF 707 that also references the blob 701. CDF 707 has a retention period associated with the event, and is selected to expire at a time equal to the time period $T_e$ after the occurrence of the event. This time period can be any suitable period. For example, as discussed above, it may be desired to store a patient's medical records for a certain period of time (e.g., two years) after the death of the patient. Thus, the retention period associated with the event of a patient's death is two years. If the event that occurred between times T2 and T3 was the death of the patient, CDF 707 can be created to have a retention period of two years from the occurrence of the event. Thus, because CDF 707 is created sometime after the occurrence of the event (e.g., at time T3), the retention period of CDF 707 can be set to two years minus the time that elapsed between the occurrence of the event and the time T3. Alternatively, instead of creating CDF 707 at time T3 with a retention period of two years minus the time between the occurrence of the event and time T3, CDF 707 may be created at the time the event occurs and may have a retention period of two years.

In the example of FIG. 7A, the retention period was only extended one time (i.e., at T2) before the occurrence of the event. However, it should be appreciated that the invention is not limited in this respect, as the retention period may be extended any suitable number of times until the event occurs.

The retention periods established before it is determined that the event occurred can be set to any suitable time period. These time periods can all be equal, or they may vary. In accordance with one embodiment of the present invention, the retention periods established before the occurrence of the event are all set to be less than or equal to the time $T_e$ that the data object is to be retained subsequent to the occurrence of the event. This is advantageous, because it ensures that the retention periods established before the occurrence of the event will all expire before the time $T_e$ after the occurrence of the event, so that the data object can be deleted as soon as possible after the expiration of this event based retention period. However, it should be appreciated that the invention is not limited in this respect, and that the retention periods established before it is determined that the event has occurred can alternatively have lengths longer than the event based retention period $T_e$. This will adversely impact the proper retention of the data object, but might only result in the data object potentially being retained longer than is necessary, which, although undesirable, is not fatal to the operation of the system. Thus, in some embodiments of the present invention, it is specifically contemplated that the retention periods established before the occurrence of the event may be set longer than the event based retention period $T_e$.

It should further be understood that each time a new CDF (e.g., CDF2 at time T2) is created to extend the retention period of a blob, the old CDF (e.g., CDF1 at time T1) may be deleted (i.e., after its retention period has expired). Alternatively, or in addition, when a new CDF is created to extend the retention period, the new CDF may include a reference the previous CDF. Thus, when the last CDF is created in response to the occurrence of the event, all of the old CDFs may be deleted by following the chain of references and deleting each successive CDF.

In the example described above in connection with FIGS. 7A and 7B, CDFs 703 and 705 (i.e., the CDFs used to initiate and extend the retention period of blob 701) had the same retention period. However, it should be understood that the invention is not limited in this respect, as such CDFs may have different retention periods. Further, in the example of FIGS. 7A and 7B, the intervals between checks for the occurrence of the event were regular (i.e., one year) and equal to one half of the retention period of the CDFs. However, the invention is not limited in this respect, as the occurrence of the event may be checked with any frequency and need not be checked at regular intervals.

Figures 8, 9:
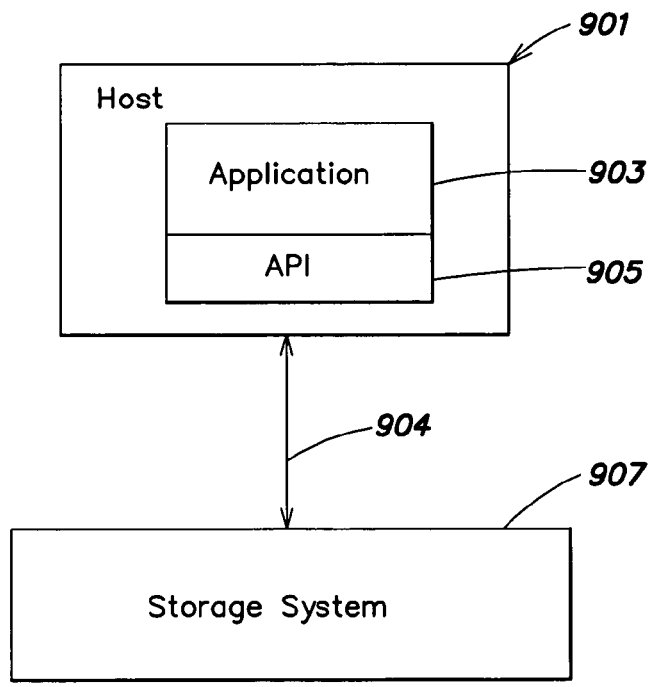
FIG. 8 is a diagram illustrating a data set used in implementing retention classes used to specify retention periods for units of data, in accordance with one embodiment of the invention.
FIG. 9 is a block diagram illustrating a storage system and host configuration on which embodiments of the present invention may be implemented.

Another embodiment of the invention that allows for establishing or changing the retention period for multiple units of data simultaneously is illustrated in FIG. 8. In some situations, it may be desirable to establish or change the retention period for many units of data at the same time. Such a situation may occur, for example, if a change impacts an entire class of data units. For example, if a change in the law shortens or lengthens the mandated retention period for a certain type of document (e.g., financial records), it may be cumbersome and time consuming to individually change the retention period for each unit of data in the impacted class. Further, such operations may be resource intensive from both the host perspective and storage system perspective, particularly when changing the retention period for a large number of units of data. For example, if the retention periods are stored within the data units themselves (e.g., CDFs), a change may result in a need to regenerate the content address for each CDF in the impacted class.

One embodiment of the invention is directed to the use of retention classes to define retention periods for units of data. Each unit of data in the class may identify its retention period as belonging to the class, but the value for the class may be stored elsewhere. By changing the value of the retention period for a retention class, which may be stored in only one or a relatively small number of places, the retention periods for all units of data in the retention class are changed. In this manner, it is not necessary to alter each unit of data individually to change their retention periods.

For example, when a host sends a request to store a CDF on the storage system, the host may indicate a retention class for the unit of data. The storage system may maintain one or more records, such as record 801 (FIG. 8), that associates retention classes with retention periods. Thus, in the example of FIG. 8, a unit of data in the "E-mail" retention class is assigned a retention period of seven years, and a unit of data in the "Financial Records" class is assigned a retention period of five years. When the storage system receives a request to delete a unit of data, the storage system may first determine which retention class the unit of data is in, and then determine the value of the retention period for that unit of data (e.g., based on record 801). The storage system may then determine if the retention period has expired, and if it has not, deny the deletion request in the manner described above.

Information identifying the retention class to which a CDF belongs may be stored in the metadata of the CDF itself, or may be stored (e.g., in a record) external to the CDF. If stored external to the CDF, the information may be stored on the host computer, the storage system or elsewhere.

In the example of FIG. 8, two retention classes are shown in record 801. This is provided only as an example, as record 801 may store any number of retention classes. Similarly, the values of the retention periods shown in record 801 are merely examples, as any suitable retention periods values may be associated with retention classes.

In record 801, retention classes are identified by a name, such as "E-mail" or "Financial Records." However, it should be appreciated that retention classes need not be identified by a human-readable name, as any suitable identifier, such as a string of number and/or characters, may be used.

It should further be appreciated that record 801 may be stored in any suitable manner. In one embodiment of the invention, record 801 is stored on the storage system. However, the invention is not limited in this respect, as record 801 or portions thereof may be stored on host computers or elsewhere. Further, the reference to a "record" is not intended to limit the form in which the relevant information is stored, as record 801 may be stored as a database table, multiple database tables, a file in the file system, or in any other suitable form.

It should be appreciated that the above-described aspect of the present invention relating to defining retention classes can be used with any of the embodiments described above, including those that place restrictions on changes that can be made to the value for a retention period defined for a class (e.g., the value in the record 801 in FIG. 8), and the above-described techniques relating to event based retention. In one embodiment of the invention, the value for a retention period for a class can be altered, possibly subject to any of the restrictions discussed above (e.g., maintaining a log of any changes). In an alternate embodiment of the invention, the value for a retention period for a class cannot be reduced, but can only be increased to ensure that a retention period is not improperly reduced to enable the improper deletion of an entire class of data units.

In accordance with one embodiment of the present invention, if the record that stores values for retention classes provides no specified retention period for a particular class, a default retention period value can be employed (e.g., an infinite retention period or no retention period).

As discussed above, reducing a retention period may be accomplished, for example, by reducing the retention period of a CDF (directly or via a class) or by deleting a CDF that defines a relatively longer retention period and replacing it with a CDF having a shorter retention period. One embodiment of the invention provides an undo feature that allows a retention period that has been reduced to be reverted back to its prior value. This feature can be used in any of numerous ways. For example, if a retention period is inadvertently reduced, the original retention period may be restored.

The undo feature can be implemented in any of numerous ways, as this aspect of the present invention is not limited to any particular implementation technique. For example, one or more records may be maintained that associate the content addresses of CDFs with previous retention period values for the CDFs. When the retention period of a CDF is reduced, the record may be updated to include the previous retention period value. As discussed above, if the retention period is stored within the CDF itself, the content address of the CDF may change. If the content address of the CDF changes when its retention period is reduced, the content address of the CDF may be updated in the record to reflect the correspondence between the new and old content addresses and the saved prior retention period. In the case of retention classes, the record may associate the previous retention period value for the retention class with a name or identifier for the retention class. When the retention period for a retention class is reduced, the record may be updated to include the previous retention value for the retention class.

To revert to a previous retention period for a CDF or retention class, a host may send a request to the storage system instructing the storage system to "undo" the previous reduction of the retention period for a particular CDF or retention class. The request may indicate to which CDF(s) or retention class(es) the request pertains, and which of the previous retention period values of the CDF(s) or retention class(es) should be restored.

Other aspects of the present invention relate to techniques for implementing the above-referenced concepts relating to event based retention and/or the reduction of previously-defined retention periods. In one embodiment of the present invention, these techniques are adapted for use with systems implemented in the manner described in the above-referenced CAS applications, but it should be appreciated that these aspects of the present invention are not limited in this respect, and can be employed with systems having numerous other types of configurations.

One illustrative system on which aspects of the invention can be implemented includes a host 901 that communicates with a storage system 907 as shown in FIG. 9. Host 901 may be, for example, a server that provides resources (e.g., data storage, email, and other services), a client (e.g., general-purpose computer systems operated by users), a network component (e.g., switch) or any other type of computer. Host 901 is coupled by a communication medium 904 to storage system 907 so that the host 901 may use the storage system 907 to store and retrieve data.

Host computer 901 executes an application program 903 that a user or administrator of host 901 may use to store data to and retrieve data from storage system 907. The application program 903 is linked with an API 905 that provides an interface for communicating with storage system 907.

API 905 may include, for example, computer object code that is provided to the programmer of application program 903. The computer object code may include routines that may be used to communicate with the storage system. When linked with API 905, the application program 903 may call these routines to communicate with storage system 907. API 905 may be linked with any number of applications, rendering it unnecessary to write computer code for communicating with storage system 907 for each application. Further, API 905 shields the programmer of application program 903 from the internal protocol by which storage system 907 communicates. That is, the programmer need not understand or even be aware of the storage system's communication protocol, as the application programmer simply uses the methods provided in the API that implement such a protocol.

In one embodiment of the invention, API 905 includes one or more routines for implementing any and/or all of the above-described aspects of the invention that can be performed by a host, including those relating to reducing the retention period of units of data and/or event based retention. The application program may use the API 905 to perform any of the aspects of the present invention described above, and the routine(s) may result in the transmission of one or more commands to the storage system 907 to implement the above-described functionality.

Although the use of an API to implement the host-based aspects of the present invention described herein is advantageous, it should be appreciated that the present invention is not limited in this respect, as other suitable implementations are also possible.

In accordance with one embodiment of the present invention directed to implementing event-based retention, an event command is employed to communicate to the storage system (e.g., storage system 907 in FIG. 9) that an event has occurred. The event command may be transmitted to the storage system from a host computer (e.g., from the host 901 via the API 905 in FIG. 9), or from any other suitable source.

In one embodiment of the present invention, the change to a new retention period in response to the occurrence of an event is limited to a new retention period that was previously defined at the time when the initial retention period for the data unit was established (e.g., at the time a CDF is written). This technique is restrictive to minimize the likelihood of a user improperly seeking to reduce a retention period for a unit of data, in that units of data are only subject to a retention period being reduced in response to an event if it was contemplated at the time the data unit was written that such a reduction would take place, and the value of the reduced retention period was specified at that time.

In accordance with one embodiment of the present invention, the event command does no more than specify that an event has occurred, and the retention period information previously stored for the data unit provides the storage system with the information necessary to determine the new retention period to be established based upon the occurrence of the event. This information can be stored on an individual basis for each implicated data unit, or alternatively, can be combined with the retention class concept discussed above, wherein classes of retention periods can be specified for the occurrence of various types of events. For example, information can be stored in a manner similar to that described above in connection with FIG. 8, indicating that whenever a mortgage has been paid, the financial records relating thereto should be retained for a period of seven years, whereas whenever a death of an individual occurs, the records relating to the individual should be retained for two years. The storage system then determines how to process the event and what action to take in any of the ways described below.

While one embodiment of the event command specifies only that the event has occurred, and does not specify a new retention period, the present invention is not limited in this respect, as the event command can include any suitable information, including information specifying a new retention period. Examples of the types of information that may be included in the event command include the content address of a CDF to which the event pertains, a class of CDFs to which the event pertains, the type of event that occurred, and/or a new retention period for the CDF may be included in the event command.

Figure 10:
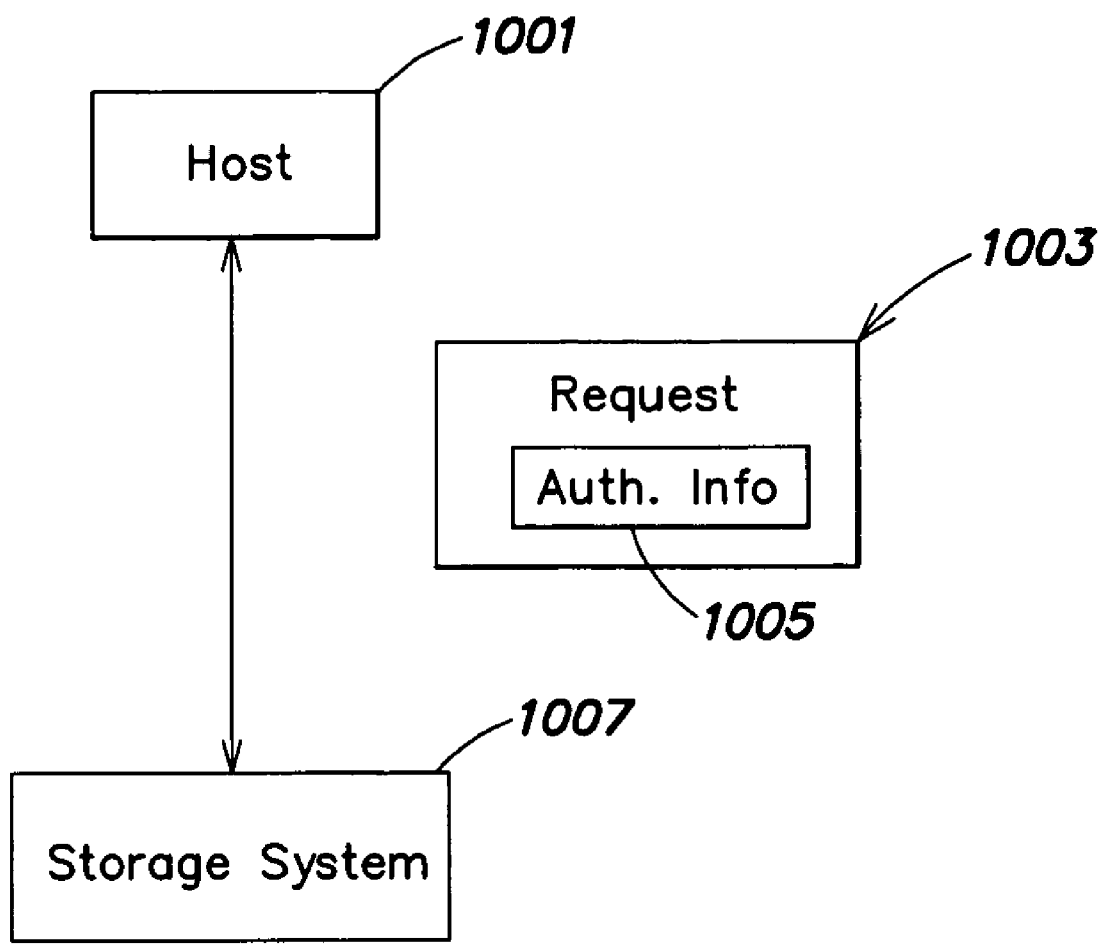
FIG. 10 is a block diagram illustrating an example of the use of authentication information in requests impacting retention periods for units of data in accordance with one embodiment of the invention.

In accordance with one embodiment of the present invention, techniques are employed that seek to prevent unauthorized reduction (include reducing to zero by deleting the data unit) of retention periods (e.g., by malicious users). In one embodiment of the invention, the storage system may determine if a request is authentic before processing the request, and if it is not, the storage system may deny the request. The authentication techniques can be implemented in any of numerous ways, as the present invention is not limited to any particular implementation technique. For example, as shown in FIG. 10, a host 1001 may send a request 1003 to storage system 1007 requesting the reduction of one or more retention periods. Request 1003 may include authentication information 1005 that storage system 1007 may use to determine if the request is authentic. Authentication information 1005 can take any of numerous forms. It may be, for example, a password or cryptographic key that the storage system may use to verify that the request came from a trusted source, possibly based upon encrypted information or keys previously provided (e.g., when the impacted data unit was written). Alternatively, or in addition, when the reduction is represented to be based upon the occurrence of an event, authentication information 1005 may be information that the storage system may use to independently verify that the event has occurred. For example, authentication information 1005 may identify an independent source (e.g., a world wide web (WWW) site) that the storage system may access to verify the occurrence of the event. As mentioned above, authentication information 1005 may be any suitable type of authentication information, as this aspect of the invention is not limited to the examples discussed above.

As discussed above, the embodiment of the present invention that employs an event command can be used in conjunction with any of the above-discussed aspects of the present invention. Thus, the event command can take any of numerous forms and include any of numerous types of information, including one or more of the following: (1) an identifier of a data unit (e.g., a CDF) or a group of data units impacted by the event; (2) an identifier of the event; (3) a new retention period based on the event (as discussed above, this is optional as the retention period can be stored elsewhere, such as in the storage system); (4) authentication information; (5) an undo field or flag to inform the storage system that an event previously indicated as having occurred had in fact not occurred; and (6) a field that establishes the ability of the newly defined retention period to be changed in the future, such that this change status need not be the same as that specified before the occurrence of an event (e.g., after the event the change status may be altered to prohibit further reduction). Again, it should be appreciated that these fields are optional, as the present invention is not limited to employing any of these particular features.

It should be appreciated that some of the above-described aspects of the present invention relate to actions that may be performed within the storage system itself. This functionality can be implemented in any of numerous ways, as the present invention is not limited to any particular implementation technique. Examples of the types of functionality that can be provided in the storage system to support various aspects of the present invention described above include the ability to process commands such as privileged commands and/or commands which indicate that an event has occurred and/or seek to reduce a previously-defined retention period. In connection with the embodiment of the present invention described above that provides authentication for a command, the storage system may be provided with functionality to perform the authentication. In connection with the embodiments of the present invention that relate to undoing an event and/or maintaining a log or history of certain actions that relate to deleting a data object before the expiration of a previously-defined retention period or reducing a previously-defined retention period, the storage system can provide the functionality to keep a history of various actions and/or any necessary logs. This functionality can be implemented in any of numerous ways, as the present invention is not limited to any particular implementation technique.

Although the illustrative examples described herein all relate to retention periods established for a CDF, it should be appreciated that the aspects of the present invention described herein are not limited in this respect, and can alternatively be employed in connection with a system wherein retention periods are assigned directly to a blob or any other type of data unit, and are not limited to a system that employs the above-described CDF and blob architecture. For example, in the examples of FIGS. 5 and 6, the retention period is associated with a CDF that references one or more blobs. Thus, in these examples, the retention period of a blob is the retention period of the CDF that references it, as blobs do not have their own directly assigned retention periods. However, the invention is not limited in this respect, and it should be understood that the aspects of the invention described herein can be employed with a system in which blobs may have directly assigned retention periods. Such blob retention periods may be stored either in an external record or in the blob itself.

It should be appreciated that the aspects of the present invention discussed above can be implemented in any of numerous ways. For example, the aspects implemented by a storage system can be implemented on one or more storage boxes that themselves that include storage devices (e.g., disk drives or tape drives), or alternatively, can be implemented on a different box disposed as an interface between one or more hosts and one or more storage systems on which the data is stored. In this respect, aspects of the present invention can be implemented on any computer in the system. As used herein, the term computer is intended to cover any device that includes a processor for processing data, and can include a storage system, a network component, a host computer or any other computing device.

Several of the above-described embodiments were described in the context of a content addressable storage system that employs CDFs associated with blobs to store and process data. However, it should be understood that the invention is not limited to use in a such a storage system, and any other type of storage system, such as one that uses conventional addressing schemes, may be used.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above. The one or more controllers may be included in one or more host computers, one or more storage systems, or any other type of computer that may include one or more storage devices coupled to the one or more controllers.

In this respect, it should be appreciated that one implementation of the embodiments of the present invention comprises at least one computer-readable medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable medium can be transportable such that the program stored thereon can be loaded onto any computer system resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

It should be appreciated that in accordance with several embodiments of the present invention wherein processes are implemented in a computer readable medium, the computer implemented processes may, during the course of their execution, receive input manually (e.g., from a user).

The phraseology and terminology used herein is for the purpose of description and should not be regarded as limiting. The use of "including," "comprising," or "having," "containing", "involving", and variations thereof herein, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method of processing data in a computer system comprising at least one host and at least one storage system, the method comprising:
    receiving a request, from the host, to delete a unit of data stored on the storage system;
    in response to the request, determining whether a previously-defined retention period for the unit of data has expired by:
        retrieving first information, associated with the unit of data, that identifies second information specifying the previously-defined retention period for the unit of data, wherein the first information is separate from the second information and includes information identifying a retention class to which the unit of data belongs, wherein the second information is the previously-defined retention period for the retention class that defines a period of time during which units of data belonging to the retention class cannot be deleted from and/or modified on the at least one storage system, and wherein the at least one storage system stores a record associating a plurality of previously-defined retention periods with a plurality of retention classes; and
        using the first information and the record stored on the at least one storage system to retrieve the second information specifying the previously-defined retention period for the unit of data;
    receiving, at the at least one storage system, a second request requesting that the at least one storage system modify the retention period of the retention class; and
    when it is determined that the retention period for the unit of data has not expired, denying the request to delete the unit of data.

2. The method of claim 1, further comprising
deleting the unit of data when it is determined that the retention period for the unit of data has expired.

3. The method of claim 1, wherein the second request is from the at least one host.

4. The method of claim 3, wherein the second request is a request to reduce the retention period of the retention class.

5. The method of claim 4, wherein receiving the second request includes determining whether the retention period for the retention class is permitted to be reduced and reducing the retention period only when the retention period for the retention class is permitted to be reduced.

6. The method of claim 5, wherein determining whether the retention period for the retention class is permitted to be reduced includes determining whether the retention period of the retention class is designated as capable of being reduced.

7. The method of claim 6, wherein determining whether the retention period for the retention class is permitted to be reduced includes determining whether the retention period of the retention class is designated as capable of being reduced by examining the retention period.

8. The method of claim 6, wherein determining whether the retention period for the retention class is permitted to be reduced includes determining whether the retention period of the retention class is designated as capable of being reduced by examining a flag associated with the retention class.

9. The method of claim 3, wherein the second request is a request to increase the retention period of the retention class.

10. The method of claim 3, further comprising:
    modifying the second information specifying the retention period in response to the second request.

11. The method of claim 10, wherein the second information is modified without modifying the content of the unit of data.

12. The method of claim 3, wherein the second request includes an event command indicating the occurrence of an event.

13. The method of claim 12, wherein the event command does not specify the manner in which the retention period of the retention class is to be reduced, and wherein receiving the second request includes determining the manner of reducing the retention period of the retention class by referring to information stored within or accessible to the storage system.

14. The method of claim 3, wherein the second request specifies the manner in which the length of the retention period of the retention class is to be reduced.

15. At least one computer readable medium encoded with instructions that, when executed on a computer system, perform a method of processing data, the computer system comprising at least one host and at least one storage system, the method comprising:
    receiving a request, from the host, to delete a unit of data stored on the storage system;
    in response to the request, determining whether a previously-defined retention period for the unit of data has expired by:
        retrieving first information, associated with the unit of data, that identifies second information specifying the previously-defined retention period for the unit of data, wherein the first information is separate from the second information and includes information identifying a retention class to which the unit of data belongs, wherein the second information is the previously-defined retention period for the retention class that defines a period of time during which units of data belonging to the retention class cannot be deleted from and/or modified on the at least one storage system, and wherein the at least one storage system stores a record associating a plurality of previously-defined retention periods with a plurality of retention classes; and
        using the first information and the record stored on the at least one storage system to retrieve the second information specifying the previously-defined retention period for the unit of data;
    receiving, at the at least one storage system, a second request requesting that the at least one storage system modify the retention period of the retention class; and
    when it is determined that the retention period for the unit of data has not expired, denying the request to delete the unit of data.

16. The at least one computer readable medium of claim 15, wherein the method further comprises:
    deleting the unit of data when it is determined that the retention period for the unit of data has expired.

17. The at least one computer readable medium of claim 15, wherein the second request is from the at least one host.

18. The at least one computer readable medium of claim 17, wherein the second request is a request to reduce the retention period of the retention class.

19. The at least one computer readable medium of claim 18, wherein receiving a second request includes determining whether the retention period for the retention class is permitted to be reduced and reducing the retention period only when the retention period for the retention class is permitted to be reduced.

20. The at least one computer readable medium of claim 19, wherein determining whether the retention period for the retention class is permitted to be reduced includes determining whether the retention period of the retention class is designated as capable of being reduced.

21. The at least one computer readable medium of claim 20, wherein determining whether the retention period for the retention class is permitted to be reduced includes determining whether the retention period of the retention class is designated as capable of being reduced by examining the retention period.

22. The at least one computer readable medium of claim 20, wherein determining whether the retention period for the retention class is permitted to be reduced includes determining whether the retention period of the retention class is designated as capable of being reduced by examining a flag associated with the retention class.

23. The at least one computer readable medium of claim 17, wherein the second request is a request to increase the retention period of the retention class.

24. The at least one computer readable medium of claim 17, wherein the method further comprises:
modifying the second information specifying the retention period in response to the second request.

25. The at least one computer readable medium of claim 24, wherein the second information is modified without modifying content of the unit of data.

26. The at least one computer readable medium of claim 17, wherein the second request includes an event command indicating the occurrence of an event.

27. The at least one computer readable medium of claim 26, wherein the event command does not specify the manner in which the retention period of the retention class is to be reduced and wherein receiving a second request includes determining the manner of reducing the retention period of the retention class by referring to information stored within or accessible to the storage system.

28. The at least one computer readable medium of claim 17, wherein the second request specifies the retention period to be reduced and the manner in which the length of the retention period of the retention class is to be reduced.

29. A storage system, comprising:
at least one storage device to store a unit of data; and
at least one controller that is adapted to:
receive a request to delete the unit of data; and in response to the request, determine whether a retention period for the unit of data has expired by:
retrieving first information, associated with the unit of data, that identifies second information specifying the previously-defined retention period for the unit of data, wherein the first information is separate from the second information and includes information identifying a retention class to which the unit of data belongs, wherein the second information is the previously-defined retention period for the retention class that defines a period of time during which units of data belonging to the retention class cannot be deleted from and/or modified on the at least one storage system, and wherein the at least one storage device stores a record associating a plurality of previously-defined retention periods with a plurality of retention classes; and
using the first information and the record stored on the at least one storage device to retrieve the second information specifying the previously-defined retention period for the unit of data;
receive a second request requesting that the storage system modify the retention period of the retention class, and to modify the second information specifying the retention period in response to the second request; and
when the at least one controller determines that the retention period for the unit of data has not expired, deny the request to delete the unit of data.

30. The storage system of claim 29, wherein the at least one controller is adapted to delete the unit of data when it determines that the retention period for the unit of data has expired.

31. The storage system of claim 29, wherein the second request is from the at least one host.

32. The storage system of claim 31, wherein the second request comprises an event command indicating the occurrence of an event.

33. The storage system of claim 32, wherein the event command does not specify the manner in which the retention period of the retention class is to be reduced and wherein the at least one controller is adapted to determine the manner of reducing the retention period of the retention class by referring to information stored within or accessible to the storage system.

34. The storage system of claim 31, wherein the second request includes third information that specifies the retention period to be reduced and the manner in which the length of the retention period of the retention class is to be reduced, and the at least one controller is adapted to reduce the length of the retention period based on the third information.

35. The storage system of claim 31, wherein the at least one controller is adapted to, in response to a second request that seeks to reduce the retention period:
determine whether the retention period for the retention class is permitted to be reduced; and
reduce the retention period only when the retention period for the retention class is permitted to be reduced.

36. The storage system of claim 35, wherein the at least one controller is adapted to determine whether the retention period of the retention class is capable of being reduced by determining whether the retention period is designated as capable of being reduced.

37. The storage system of claim 36, wherein the at least one controller is adapted to determine whether the retention period of the retention class is designated as capable of being reduced by examining the retention period.

38. The storage system of claim 36, wherein the at least one controller is adapted to determine whether the retention period of the retention class is designated as capable of being reduced by examining a flag associated with the retention class.

39. The storage system of claim 29, wherein the at least one controller comprises:
means for receiving the request, from a host, to delete the unit of data stored on the storage system;
means for determining whether the previously-defined retention period for the unit of data has expired by:
retrieving the first information, associated with the unit of data, that identifies the manner of accessing the second information specifying the previously-defined retention period; and
using the first information and the record stored on the at least one storage device to retrieve the second information specifying the previously-defined retention period; and
means for, when it is determined that the retention period for the unit of data has not expired, denying the request to delete the unit of data.

* * * * *